(12) United States Patent
Heath et al.

(10) Patent No.: US 9,052,988 B1
(45) Date of Patent: Jun. 9, 2015

(54) FEATURED ITEMS OF DISTRIBUTED DISCUSSION COLLABORATION

(71) Applicant: Google Inc., Mountain View, CA (US)

(72) Inventors: Taliver Heath, Mountain View, CA (US); Dave Young, San Francisco, CA (US); Colby Ranger, San Francisco, CA (US)

(73) Assignee: Google Inc., Mountain View, CA (US)

( * ) Notice: Subject to any disclaimer, the term of this patent is extended or adjusted under 35 U.S.C. 154(b) by 191 days.

(21) Appl. No.: 13/656,334

(22) Filed: Oct. 19, 2012

Related U.S. Application Data

(63) Continuation of application No. 12/484,784, filed on Jun. 15, 2009, now Pat. No. 8,321,361.

(51) Int. Cl.
*G06F 15/16* (2006.01)
*G06F 13/00* (2006.01)
*G06F 9/50* (2006.01)

(52) U.S. Cl.
CPC .......... *G06F 13/00* (2013.01); *G06F 2209/503* (2013.01); *G06F 9/5044* (2013.01)

(58) Field of Classification Search
USPC .................. 709/206, 201–204, 217, 219, 327
See application file for complete search history.

(56) References Cited

U.S. PATENT DOCUMENTS

| | | | |
|---|---|---|---|
| 6,230,185 B1 * | 5/2001 | Salas et al. ..................... | 709/205 |
| 7,664,669 B1 | 2/2010 | Adams et al. | |
| 8,321,361 B1 * | 11/2012 | Heath et al. ..................... | 706/45 |
| 8,819,564 B1 * | 8/2014 | Heath et al. ..................... | 715/751 |
| 2002/0154010 A1 * | 10/2002 | Tu et al. ......................... | 340/517 |
| 2002/0157017 A1 * | 10/2002 | Mi et al. ......................... | 713/200 |
| 2008/0091777 A1 * | 4/2008 | Carlos ............................ | 709/204 |
| 2008/0141145 A1 * | 6/2008 | Klausmeier ..................... | 715/751 |
| 2009/0094329 A1 * | 4/2009 | Ambati et al. ................. | 709/204 |
| 2009/0240516 A1 | 9/2009 | Palestrant | |
| 2010/0287104 A1 | 11/2010 | Leroy | |
| 2011/0106662 A1 * | 5/2011 | Stinchcomb ............... | 705/26.43 |
| 2013/0066750 A1 | 3/2013 | Siddique et al. | |

OTHER PUBLICATIONS

Xanga.com, "Introducing Flagging", accessed at http//john.xanga.com/475275853/introducing-flagging/, dated May 1, 2006, accessed Oct. 6, 2009, 1 page.
Xanga.com, "Featured Xanga Questions", accessed at http:..featuredquestions.xanga.com/weblog/?uni-22-direction=n&uni-22-nextdate=6%2f2009, dated Jun. 14, 2009, accessed Oct. 6, 2009, 2 pages.

* cited by examiner

*Primary Examiner* — Jude Jean Gilles
(74) *Attorney, Agent, or Firm* — Patent Law Works LLP

(57) ABSTRACT

In an embodiment, a method for distributed discussion collaboration is provided. The computer-implemented method includes selecting a featured discussion item for each of one or more collaborators based on information associated with each respective collaborator. The method also includes providing selected featured discussion items for display to respective one or more collaborators. The method further includes receiving voting information for the featured discussion items displayed to the respective one or more collaborators. In another embodiment, a system for distributed discussion collaboration includes a selection module configured to select a featured discussion item for each of one or more collaborators based on information associated with each respective collaborator. The system also includes a view controller and a voting module.

20 Claims, 4 Drawing Sheets

FEATURED ITEMS OF DISTRIBUTED DISCUSSION COLLABORATION

BACKGROUND

Speakers often invite questions from an audience. Some questions might benefit the majority of the participants while other questions may only have the effect of needlessly sidetracking a speaker. Sometimes good questions may never get asked or answered.

Some presentation formats allow questions to be submitted in text by participants in a presentation or event. Such formats are provided for distance learning, online presentations and teleconferences. However, the questions of other participants are usually never seen by all of the participants. The questions that do get answered are usually picked in sonic ad hoc fashion by a moderator. Audience members may not have a chance to decide or influence which questions they want to have answered.

Participants often like to respond to and influence discussion topics. Some event hosts welcome or seek input from participants and are better served by such participation. Frequently, participants can determine which questions, topics or discussion items are most important to participants. This determination can include participant votes on the quality or popularity of a discussion item. However, the discussion item receiving the most positive votes for a discussion item may not be representative of the participant group as a whole.

Potential questions can be presented to individual participants in order to elicit their voting input before they are formally asked of the host or guest. Unfortunately, these questions are usually selected at random and may not be presented to the right demographic of participants. Discussion items provided to participants at random can also be ineffective in encouraging further participation by the participants. Furthermore, votes for a discussion item may be unchecked by more reliable participants.

BRIEF SUMMARY OF THE INVENTION

Embodiments described herein relate to systems and methods for distributed discussion collaboration. In an embodiment, a system for distributed discussion collaboration is provided. The system includes a selection module configured to select a featured discussion item for each of one or more collaborators based on information associated with each respective collaborator. The system also includes a view controller configured to provide the selected featured discussion items for display to respective one or more collaborators. The system further includes a voting module configured to receive voting information for the featured discussion items displayed to the respective one or more collaborators.

In another embodiment, a method for distributed discussion collaboration is provided. The computer-implemented method includes selecting a featured discussion item for each of one or more collaborators based on information associated with each respective collaborator. The method also includes providing, selected featured discussion items for display to respective one or more collaborators. The method further includes receiving voting information for the featured discussion items displayed to the respective one or more collaborators. In another embodiment, the discussion items are submitted and voted on during a live event.

In a further embodiment, a method for distributed discussion collaboration during a live event having a focal point of discussion is provided. A live event having a focal point of discussion may include, but is not limited to, a talk, presentation, speech, performance, debate, panel discussion, athletic event, play, town hall meeting, showing, viewing, or any other event that occurs in real-time during when collaborators may participate and collaborate in a distributed discussion. A focal point of discussion may include, but is not limited to, a speaker, what is being presented, a political candidate, a panel of speakers, an actor, a singer, an athlete, video or any other person or thing that draws the attention of an audience or participants to the same focus of discussion during the live evert. The computer-implemented method includes selecting a featured discussion item for each of one or more collaborators based on information associated with each respective collaborator, wherein the discussion items were electronically submitted by collaborators during the live event and the discussion items relate to the focal point of discussion. The method also includes providing selected featured discussion items for display to respective one or more collaborators participating in the live event. The method further includes receiving voting information for the featured discussion items displayed to the respective one or more collaborators during the live event.

Further embodiments, features, and advantages of the invention, as well as the structure and operation of the various embodiments of the invention are described in detail below with reference to accompanying drawings.

BRIEF DESCRIPTION OF THE FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Participants often like to respond to and influence discussion topics. Potential questions can be presented to individual participants in order to elicit their voting input before they are formally asked of the host or guest. A discussion item selected for presentation to a participant may be referred to as a featured item. Unfortunately, these questions are usually selected at random and may not be presented to the right demographic of participants. Discussion items provided to participants at random can also be ineffective in encouraging further participation by the participants. Furthermore, votes for a discussion item may be unchecked by more reliable participants.

According to aspects of the invention, the selection of which discussion items to feature to which participants can be more finely tuned to improve the quality of the discussion items and to increase participation. Purposeful selection of featured items can more diplomatically determine which discussion items will be seen, voted on, rejected, or ultimately answered. This helps to ensure that each submission is given a chance to take the lead based on its merit. According to embodiments of the invention, submitted items may be tracked over time to ensure that old favorites do not gain an unfair lead over more recent favorites. Customizing the selection of featured items for each collaborator can maximize the value of distributed collaboration and make more efficient use of the collaborators' time.

Embodiments described herein refer to systems and methods for distributed discussion collaboration. A collaborative event may involve multiple collaborators that can be distributed in the same physical vicinity of the speaker or presenter or in different locations but participating in the same event. An event may include a live event, talk, topic of discussion, presentation, meeting, speech, debate, roundtable, panel, question and answer session, or any other format where participants may contribute to a presentation or discussion. Collaborators may be participants, audience members, employees, students, attendees or any other group of people focused on a topic, person, group of persons, or any other focal point of discussion. Collaborators can be invited to the event or otherwise allowed to participate. According to many embodiments, the methods and systems referred to herein are meant to augment, not replace, live participants and questioners.

Example Systems for Distributed Discussion Collaboration

Figure 1:
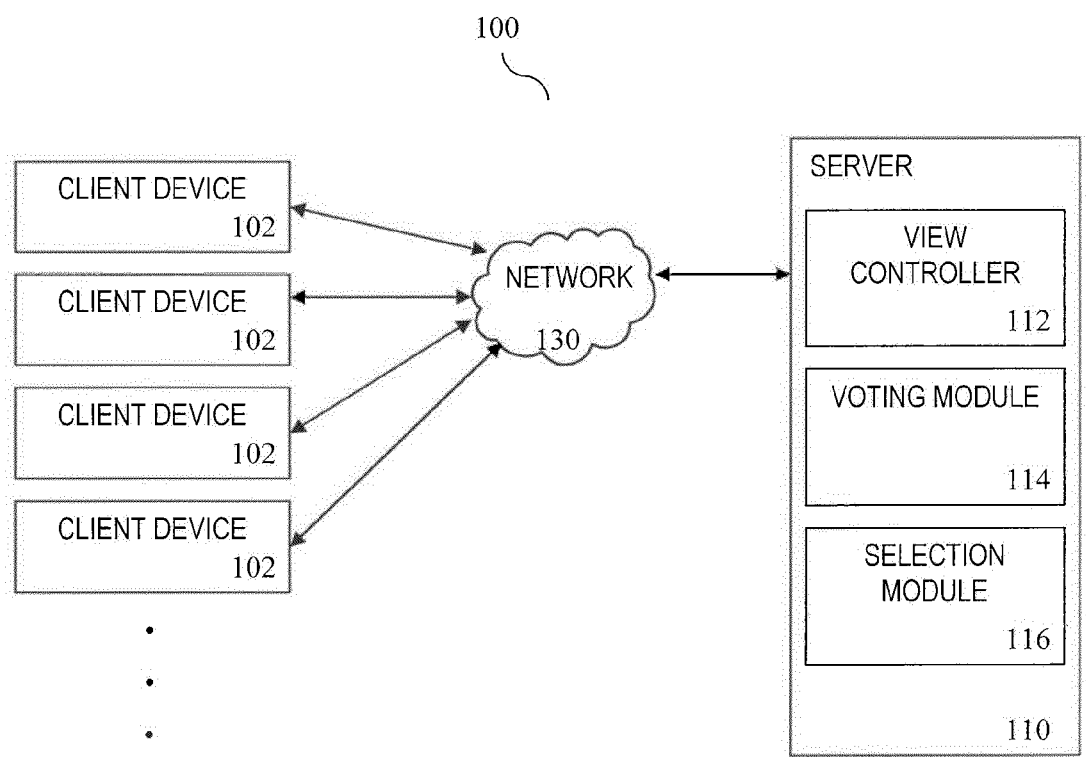
FIG. 1 illustrates a system for distributed discussion collaboration, according to an embodiment of the present invention.

FIG. 1 illustrates an exemplary system 100 for distributed discussion collaboration, according to an embodiment of the present invention. System 100 shows client device 102. Client device 102 may be a computing device having one or more processors or memories (e.g., computer, mobile device, laptop, cell phone, smart phone, media player, or set-top box). System 100 also shows server 110, which may be a computing device having one or more processors or memories (e.g., computer, mobile device, laptop, cell phone, smart phone, media player, or set-top box) operating in a server capacity. Further, a computing device can include, but is not limited to, a device having a processor and memory for executing and storing instructions. Software may include one or more applications and an operating system. Hardware can include, but is not limited to, a processor, memory and graphical user interface display. The computing device may also have multiple processors and multiple shared or separate memory components. For example, the computing device may be a clustered computing environment or server farm. Server 110 and client devices 102 may be coupled directly or over network 130.

In an embodiment, server 110 may include view controller 112, voting module 114 and selection module 116. View controller 112 may be configured to provide featured items for display through a web browser or through any other customized application or display, according to an embodiment. The display may include a place where one or more featured items may be presented to a collaborator to be voted on by the collaborator. In an embodiment, view controller 112 may control the display on client device 102. View controller 112 may also exist on client device 102. In yet another embodiment, it is desirable that view controller 112 be configured to display the featured item and/or voting information in a clean and simple manner. In some cases, collaborators may be allowed to personally customize some aspects of the display. In other cases, view controller 112 may function during periods of time when client device 102 is not connected to server 110. According to an embodiment, an agenda for an event can be created and/or displayed using view controller 112.

Featured items may be selected from discussion items submitted by collaborators and received by server 110, according to embodiments of the invention. Discussion items may include questions, topics, or other points of presentation or discussion. Collaborators may submit new discussion items digitally, textually, visibly or audibly through client device 102. In other cases, collaborators may submit new discussion items by another physical manifestation, recorded manually or automatically by system 100. Existing discussion items may also be changed or edited. Client device 102 may use a form, webpage, microphone or any other means for obtaining discussion items and transmitting them to server 110. According to an embodiment, view controller 112 may be configured to provide featured items selected for particular collaborators.

Discussion items may also include additional discussion item information. Such information may include identification of the collaborator contributing the discussion item, title of the contributor, a time and/or date of the discussion item, affiliation information, team information, categorization information, or any other information that may be pertinent to improving the effectiveness of an event. In an embodiment, any combination of discussion item information may be present. In another embodiment, some or all of this item information may be removed or marked as anonymous.

Selection module 116 may be configured to select a featured discussion item for each of one or more collaborators, according to an embodiment. Selection module 116 may feature a discussion item for one collaborator but feature a different discussion item to another collaborator. In most cases, each feature item can be individually selected for a collaborator to vote on. According to an embodiment, this selection may be based on information associated with each respective collaborator. Collaborator information may include any information about a collaborator, including a collaborator's identity or preferences. For example, collaborator information may include geographical or demographical information. Collaborator information can also include any information about the collaborator's membership or position in an organization.

In another example, collaborator information may include information providing a measure of a collaborator's voting experience. Voting experience may include a history of votes cast for various discussion items for various events. Voting experience may include a duration of time a collaborator has voted for discussion items or featured items. Voting experience may include a number of votes cast or a frequency of participation. Discussion items voted on may be sub-categorized or analyzed to provide more information about a collaborator's voting experience. In an embodiment, a collaborator may be associated with a measure or value indicating his or her voting experience. This value may be attributed globally, for a series of events or topics or for a single event. A collaborator may have different values attributed to different representations of participation. Further embodiments of selection module 116 will be described in a later section of this description.

Collaborators may be provided an opportunity to view and vote on featured items. Voting module 114 is responsible for the administration and collection of voting information for featured items. In an embodiment, collaborators may be provided voting instructions or voting help through client device 102. Voting information may be collected from collaborators performing an action using client device 102. In another embodiment, voting may be performed by a physical manifestation. In such a case the voting information may be collected and provided to voting module 114 manually or by some automatic process of system 100. In a further embodiment, a polling mechanism may be employed. In another embodiment, collaborators may skip a featured question or flag it as inappropriate.

Voting information may be collected according to a voting configuration. The voting configuration may easily be created, updated or replaced. In some cases, pluggable voting logics may be used. In an embodiment, voting information may be collected by counting votes. In another embodiment, voting information may include additional information such as timestamps, response times, who voted, who did not vote, or other participation information that may assist in the analysis of voting information. A voting configuration may be constructed based on these various types of collaborator information. A voting configuration may also include the method of counting votes based upon who is submitting votes. In a further embodiment, a voting configuration may consider the user profiles or affiliations of collaborators. The voting configuration may also consider whether the collaborator is internal or external to a group or organization. The voting configuration may be used in the analysis of voting information. According to another embodiment, a voting configuration may include collecting separate voting information on whether or not a discussion item has been answered or sufficiently addressed.

Voting information may be collected and analyzed in various ways. For example, votes may be counted on a one vote per collaborator basis. In another example, votes cast by certain collaborators may be given greater weight. In a further example, positive votes may be given greater weight than negative votes as to allow somewhat controversial discussion items to receive a greater chance of being addressed. For instance, a positive vote could carry twice as much weight as a negative vote. In another case, the most controversial discussion items may be sought out. Additional examples of voting may include multiple voting, ranked voting, scored voting, or any other form of voting customized to the event. A discussion item's voting score may also be affected by the number of times a discussion item is skipped or flagged as inappropriate.

Figure 2:
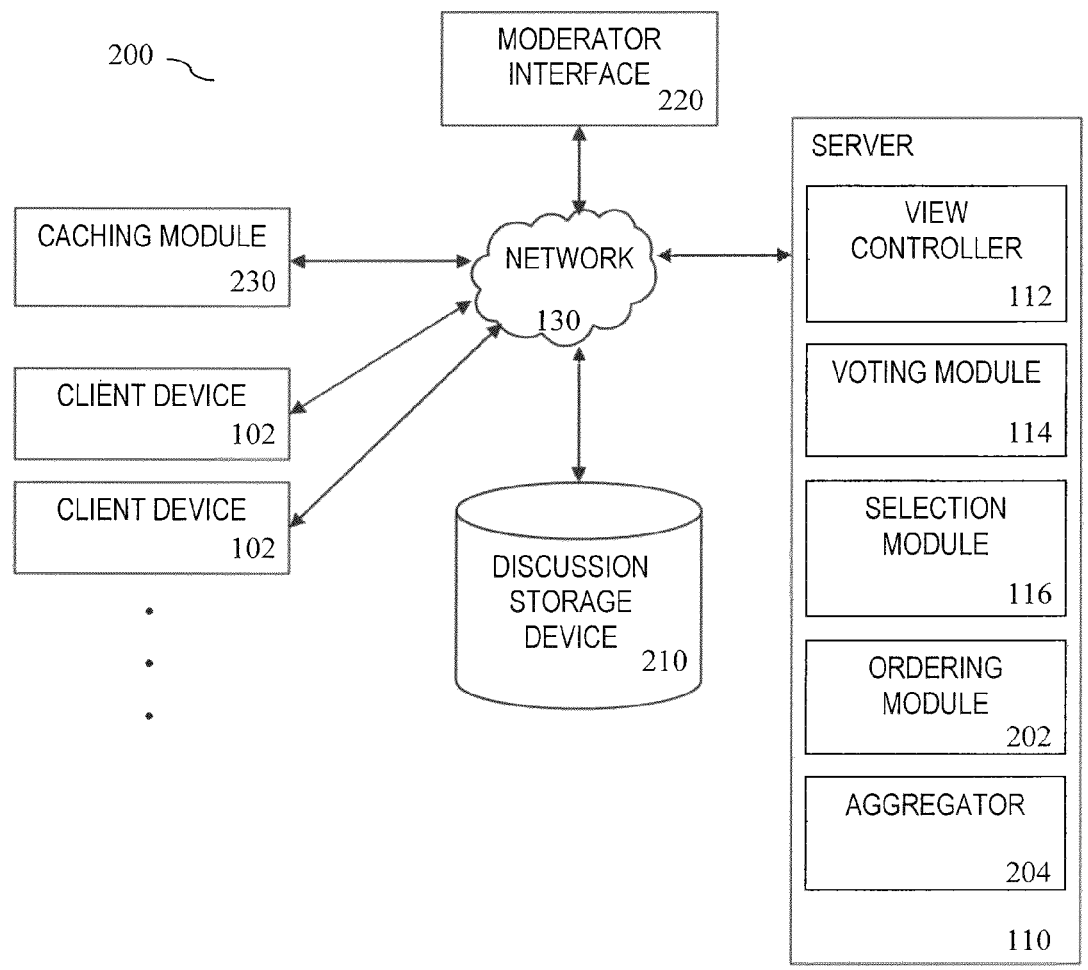
FIG. 2 illustrates another system for distributed discussion collaboration, according to an embodiment of the invention.

FIG. 2 illustrates another exemplary system 200 for distributed discussion collaboration, according to an embodiment of the present invention. System 200 shows client device 102 and server 110 coupled over network 130. Server 110 may include view controller 112, voting module 114 and selection module 116. System 200 may further include ordering module 202, aggregator 204, or discussion storage device 210. Discussion storage device 210 may be a database or any other data storage medium. Discussion storage device 210 may be configured to store discussion items, discussion item information, collaborator information, voting information, comments, or any other related data. According to an embodiment, discussion storage device 210 may be a separate storage medium coupled to server 110 over network 130. According to another embodiment, discussion storage device 210 may exist on server 110.

According to embodiment, aggregator 204 may be configured to receive discussion items. Discussion items may be received prior to or during an event. In another embodiment, aggregator 204 may create or update a user profile for the collaborator and associate the discussion item with the collaborator. In a further embodiment, aggregator 204 may be configured to receive discussion items anonymously. Discussion items may be aggregated and voted on before or during an event.

The discussion items aggregated by aggregator 204 may be sorted or arranged based upon information from ordering module 202. In an embodiment, aggregated items may be ordered based upon an analysis of voting information received from voting module 114. Voting information analysis may be performed by ordering module 202. In another embodiment, some analysis of the voting information may also be performed by voting module 114. Ordering may involve determining an order or placement of the discussion items in relation to each other. In an embodiment, ordering may include placing or promoting more popular discussion items on an aggregated list. Ordering may include removing or demoting less popular discussion items. In some cases, ordering may include promoting or demoting discussion items on an aggregated list based upon determined scores for the discussion items. In other cases, ordering may include prioritizing.

Ordering may also include ranking, according to an embodiment. In some embodiments, a rank may be assigned to a discussion item based upon positive votes, negative votes, times skipped, times viewed, times flagged as inappropriate, or any combination of these or other factors. In yet another embodiment, ordering may involve including only discussion items that reach a certain threshold. As would be appreciated by those skilled in the art(s), ordering may be determined in any number of ways. Ordering may be determined prior to or during an event. A user, speaker, moderator or any other person given such a responsibility may configure ordering module 202 prior to or during an event.

In an embodiment, discussion items may be merged or combined with aggregated items of another data source or event. The additional aggregated items may include those of another ongoing event or a past event. Aggregated items may also be arranged to overlap or accumulate with other aggregated items. In some cases, an agenda or event may carry over aggregated items from a past or different event. This may be performed with the assistance of discussion storage device 210. In addition, a new agenda may be displayed and/or created based upon the combined or merged aggregated items. In other cases, all information for an event is deleted or unavailable for further analysis or review.

In a further embodiment, voting information may be merged or combined with voting information of another data source or event. The additional voting information may include that of another ongoing event or a past event. Voting information may also be arranged to overlap or accumulate with other voting information. In some cases, an agenda or event may carry over voting information from a past event. This may be performed with the assistance of discussion storage device 210. In other cases, all information for an event is deleted or unavailable for further analysis or review.

In another embodiment, collaborator information may be merged or combined with collaborator information of another data source or event. The additional collaborator information may include that of another ongoing event or a past event. Collaborator information may also be arranged to overlap or accumulate with other collaborator information. In some cases, an agenda or event may carry over collaborator information from a past event. This may be performed with the assistance of discussion storage device 210. In other cases, all information for an event is deleted or unavailable for further analysis or review.

According to another embodiment, system 200 may include moderator interface 220. Moderator interface 220 is a user interface that enables a moderator or someone of a similar responsibility to manage aggregator 204, ordering module 202, voting module 114, selection module 116 and/or view controller 112. Moderators or responsible collaborators may interact with moderator interface 220 through textual, graphical, audile, or other interactive means. Moderator interface 220 may be used to configure the operation of the components of system 200. In an embodiment, moderator interface 220 may be used to configure the operation of any combination of the modules of server 110. Moderator interface 220 may also be used to monitor and/or moderate collaborator participation, discussion items, comments, voting and/or any other related information or processes. Moderator interface 220 may be coupled to server 110 directly or over network 130.

According to a further embodiment, system 200 may include caching module 230. Caching module 230 may be configured to cache aggregated items, collaborator information, discussion item information, comments, or voting information. In an embodiment, caching module 230 may be coupled to server 110 directly or over network 130. In another embodiment, caching module 230 may exist on server 110. In a further embodiment, caching module 230 may exist on client device 102.

Caching module 230 may be configured to synchronize information between client device 102 and server 110. In another embodiment, view controller 112 may be configured to synchronize information between client device 102 and server 110. In a further embodiment, system 200 may be configured to synchronize information between the modules within server 110. In another embodiment, system 200 may be configured to synchronize information between discussion storage device 210, server 110, and/or client device 102.

Aggregated items, ordering information and voting information may be communicated to view controller 112. View controller 112 may be configured to display aggregated items, including featured items that have been voted on, on a user interface or other type of display. In an embodiment, the display may be on client device 102. In another embodiment, the display may be on a large viewing means or through any other means visible to many participants. In another embodiment, view controller 112 may be configured to display the aggregated items with their respective voting information. In a further embodiment, respective voting information may include a voting score. It may also include a voting amount indicator, which determines how many votes have been cast. The voting amount may be by shown by number of votes cast. It may also be shown by a percentage of votes cast out of the total potential votes that may be cast. The voting information may be shown through text, numbers, graphics, audio, animation, video or any other form of multimedia. In an embodiment, the voting information may be shown in real-time. In another embodiment, voting information may be periodically updated. In a further embodiment, view controller 112 customizes the view for each collaborator based upon an affiliation of the collaborator or upon submissions by the collaborator. In another embodiment, certain discussion items, item information, or voting information may or may not be available to some collaborators while it is available to other collaborators.

Discussion items aggregated prior to an event may be used to make an agenda for an event. Client device 102 may also be used to create and/or display an agenda for an event. In some cases, server 110 or a component connected to or in communication with server 110 may be used to create and/or display an agenda for an event. According to another embodiment, an agenda for the event could be created in another form. Such a form may include a physical or electronic document. Other forms may include using audio, video or other multimedia to represent an agenda for the event. According to a further embodiment, agendas may also be customized based upon the identity of a collaborator.

Example Display of a Featured Item

Figure 3:
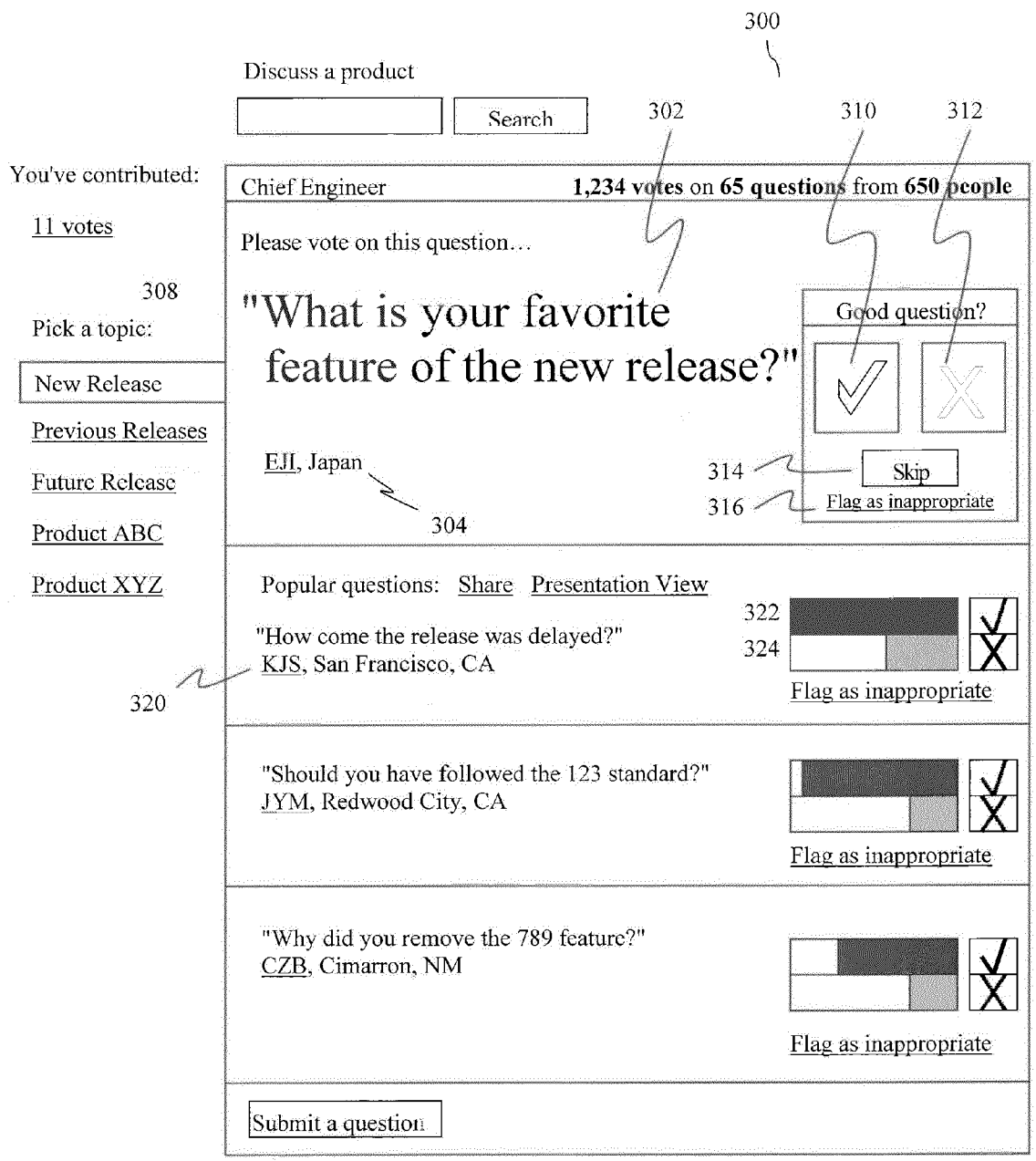
FIG. 3 illustrates a user view, according to an embodiment of the invention.

FIG. 3 illustrates an exemplary user interface view or display 300 relating to a system or method for distributed discussion collaboration, according to an embodiment. Display 300 and its parts are shown for purposes of illustration and not intended to limit the present invention. Display 300 shows featured item 302 along with information 304 about the collaborator that submitted the discussion item that is now featured. According to an embodiment, display 300 may be displayed with the assistance of system 100 or system 200, including view controller 112. Display 300 also shows other discussion items such as 320 that have been previously voted on. Featured item 302 and discussion item 320 both belong to an event, the event being a discussion of the "New Release" of a product. This event can be selected among other topics, events, or series of topics. Event list 308 illustrates other example events or topics of discussion. Each event may be live, ongoing, or subject to a window of participation.

Display 300 shows voting information. A positive vote metric 322 and negative vote metric 324 are shown for discussion item 320. A representation of a positive or negative vote may be shown in various ways and is not limited to the example shown in this embodiment. Voting scores or metrics can be represented numerically, graphically or in any other manner which communicates voting results. For example, voting metrics 322 and 324 are represented by graphical bars. The longer the length of a bar, as opposed to a shorter length, the larger the voting score.

Display 300 shows voting mechanisms. Positive voting button 310, negative voting button 312 and skip button 314 are shown for featured item 320. As would be appreciated by those skilled in the art(s), votes may be cast with user interface display 300 in any fashion. For example, votes may be cast by pressing or clicking on a representation of a positive or negative vote, such as buttons 310 and 312. In another example, votes may be cast by pressing or clicking on featured item 302 or discussion item 320 and voting in response to a voting prompt. In some cases, a featured item may be flagged as inappropriate by clicking on the "Flag as inappropriate" text 316. The embodiment shown in display 500 may also have other features and/or links.

Example Method for Distributed Discussion Collaboration

Figure 4:
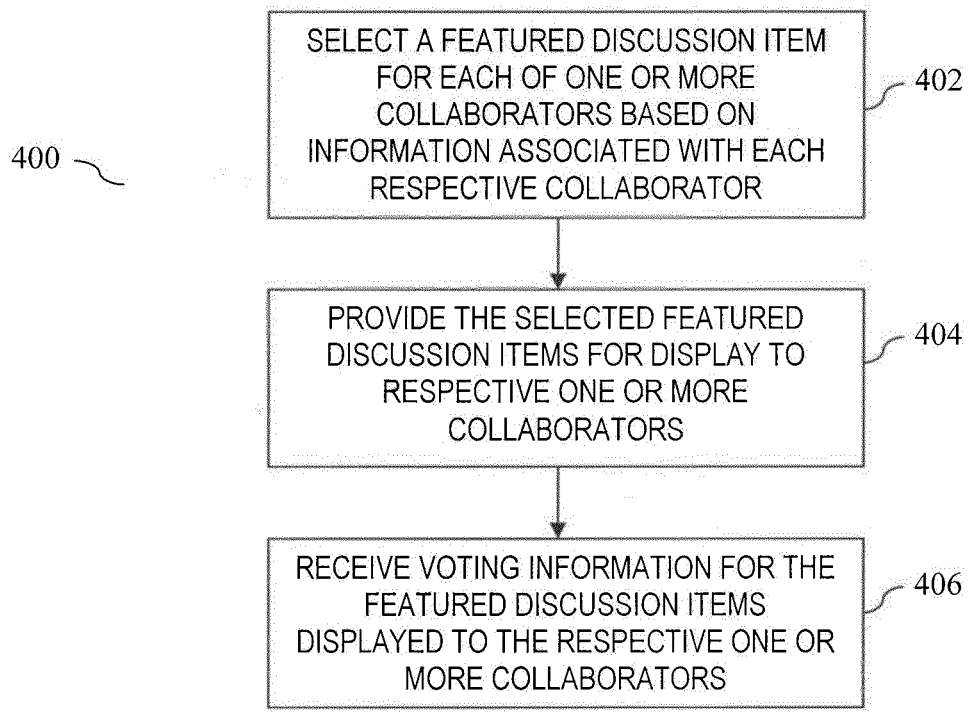
FIG. 4 is a flowchart illustrating a method for distributed discussion collaboration, according to an embodiment of the invention.

FIG. 4 illustrates an exemplary method 400 for distributed discussion collaboration, according to an embodiment of the present invention (steps 402-406). In step 402, selection module 116 selects a featured discussion item for each of one or more collaborators. The featured discussion item is selected for each collaborator based on information associated with each respective collaborator. According to an embodiment, selection module 116 is a processing device. According to another embodiment, selection module 116 is computer code executed by a processing device. In some cases, selection may take place with manual assistance. In other cases, selection may take place automatically.

In step 404, the selected featured discussion items are provided for display to respective one or more collaborators. This step may be assisted by view controller 112. In some cases, step 404 may be performed with manual assistance. In other cases, step 404 may be performed automatically. In step 406, voting information for the featured discussion items displayed to the respective one or more collaborators is received. Voting module 114 may assist with this step. In some cases, vote collection may take place with manual assistance. In other cases, vote collection may take place automatically. According to an embodiment, the voting information may be processed and attributed to the respective discussion items, and the discussion items may be ordered and displayed. According to a further embodiment, a speaker or presenter may review the discussion items and voting information in order to more effectively communicate to participants of an event. In some cases, steps 402-406 may take place during a live event having a focal point of discussion. The focal point may be a speaker, presentation, or performance. In other cases, steps 402-406 may take place over a distributed network.

Selection of a Featured Item

As described earlier, selection module 116 may be configured to select a featured discussion item for each of one or more collaborators. Selection module 116 may feature a discussion item for one collaborator but feature a different discussion item to another collaborator. Each featured item can be individually selected for a collaborator to vote on. According to an embodiment, this selection may be based on information associated with each respective collaborator. In an example, collaborator information may include a measure of a collaborator's voting history. In another example, collaborator information may include a measure of conformity of a collaborator's voting history to a voting history of a group of collaborators.

For example, a collaborator's previous votes for an event may be compared to the previous votes cast by collaborators of a select group for the same discussion items. Votes cast for discussion items of the same event or related to an event may also be compared. Voting conformity may be determined or measured based on how similar the votes are between a collaborator and a select group of collaborators. According to a further embodiment, collaborators of a group may be selected based on voting experience, consistency in voting, amount of participation, or membership in other groups. In most cases, group members may be selected to provide a metric for how reliable or serious a collaborator may be about his or her voting. Votes by members of a group tend to be provided a greater voting weight than collaborators with less of a track record. In a farther embodiment, a voting history of a group may include votes by the group on discussion items associated with an event, wherein the featured discussion item provided to a collaborator is also related to the event.

According to an embodiment, voting module 114 may provide a greater or lesser weight to a collaborator based on collaborator information. For example, votes of a collaborator with more voter experience may be provided greater weight than votes of a brand new collaborator. In another example, votes of a collaborator with a voting history that conforms to a select group of voters may also be provided a greater weight than other collaborators. According to further embodiments, these weights may be globally assigned. Different weights may also be provided at the event level. Weights may also be assigned per a series of events. A collaborator may be assigned any number of weights for any number of categories or situations. In another embodiment, voting weights may change over time. In some cases, weights may change for votes already cast for a discussion item.

Other factors may contribute to a voting weight or a reliability score associated with a collaborator, according to an embodiment. For example, a reliability score of a collaborator may be decreased if the collaborator submits a discussion item considered to be inappropriate by a substantial margin. In another example, a collaborator score may be negatively affected if the collaborator marks a question inappropriate when the discussion item is considered not to be inappropriate by a large margin. According to an embodiment, the behavior of a collaborator may be rated in comparison to other collaborators for an event or series of events. In some cases, a collaborator may have a low rating for one event or series of events, but may have a high rating in another series of events. The collaborator's rating or reliability score can affect a weight of the collaborator's votes.

According to an embodiment, selection module 116 may be configured to select a featured discussion item with a negative voting history for voting by a group of collaborators. The collaborators of the select group may be selected based upon a measure of voting experience and a voting history. In other words, a discussion item with, for example, a negative score can be presented as a featured item to more trusted collaborators for their more heavily weighted votes. In such a case, it can be determined if the discussion item with a negative voting history deserves such a negative voting history or whether a discussion item has been voted down surreptitiously. This can result in the promotion, further demotion, or removal of a discussion item. In some cases, it is possible that a more controversial discussion item will be purposely featured more often. In other cases, it is possible for there to be divergent views within a selected group of collaborators. In such cases, a group may be selected with a purposefully diverse voting history.

Selection module 116 may also be configured to select a featured discussion item for display to a collaborator based upon a rank of the discussion item and a measure of voting experience of the collaborator, according to an embodiment. In some cases, a rank of a discussion item may be deteiiined by ordering module 202 based upon a positive voting history. It is also possible that some discussion items are pre-tagged in some manner as being more important than others. According to a further embodiment, a higher ranked discussion item may be provided to a collaborator with a smaller voting experience. This may result in a more positive experience for newer participants and can lead to more participation in the future. Future featured questions of lesser rank may be featured later or later mixed in with higher ranked discussion items. In another embodiment, lower ranked discussion items may be provided to collaborators with a larger voting experience. In such cases, providing less popular featured items to a collaborator with a longer or more frequent voting history can more likely provide votes for less popular questions without easily deterring future participation by the collaborator. This can help questions of lesser importance get a fair chance of receiving a higher rank. On the other hand, this can also help to filter out discussion items that are least likely to benefit the community of collaborators.

Selection module 116 may be configured to select a featured discussion item for display based upon a rank and a submission time of the discussion item, according to an embodiment. For example, a brand new discussion item with a recent submission time and a neutral voting score may be featured to more collaborators. In another example, discussion items that have been submitted some time ago and have accumulated a number of votes may be featured less often than others.

Selection module 116 may be configured to select a featured discussion item for display to a collaborator based upon a geographical relationship between the collaborator and the featured discussion item, according to an embodiment. For example, the featured discussion item may pertain to a certain country or area of the country. Collaborators having some geographical or legal relationship to the country may be more interested in the discussion item or may carry more voting weight in regard to the discussion item. In such a case, a collaborator may receive more featured items having a geographical relationship to the collaborator. In other cases, featured items may be presented to collaborators from a diversity of geographical areas for sampling purposes. Local pride can sometimes be a motivating factor for collaborators.

Selection module 116 may be configured to select a featured discussion item for display based upon a time left for voting and a rank and voting history of the featured discussion item, according to an embodiment. For example, a discussion item with a closing time window for voting may be featured more often if it has a lower rank. In some cases, it may have a higher rank and it may be necessary to collect more votes for the discussion item before time expires. In another embodiment, a featured discussion item may be selected for a collaborator based solely upon a time left for voting.

Selection module 116 may be configured to select or provide two or more featured discussion items for display based upon a relationship between the two or more featured discussion items, according to an embodiment. For example, a collaborator may be provided two feature items and asked to select which discussion item will receive a higher vote. These feature items may be related to each other. In some cases, the feature items may be substantively the same but worded differently. Collaborators may choose the discussion item written more clearly. In other cases, feature items may be related but of an opposite direction of thought. Many other reasons may exist for providing two featured items. In another embodiment, two featured items may be presented which may not necessarily be related. In a further embodiment, a collaborator may be presented more than two featured items at a time and asked to select a favorite. In some cases, a collaborator may be presented more than two featured items at a time and asked to vote if one or more discussion items are inappropriate or should be removed.

Selection module 116 may be configured to select a discussion item for a collaborator based upon a measure of voting experience of the collaborator and a confidence of the discussion item, according to an embodiment. In some cases, a confidence value may be associated with a discussion item. This confidence value may represent that the discussion item is more likely to be of a higher rank or may be of a higher rank. It may also represent an importance of the discussion item. In some cases, discussion items of a higher confidence value may be presented to collaborators with less voting experience in order to ease future participation by the collaborator. In some cases, a collaborator may not be a new collaborator, but may be returning from being away from the discussion for some time. In another embodiment, a confidence value may be assigned to a discussion item. This may help to collect more voting input for particularly important discussion items.

Selection module 116 may be configured to select featured items from various sets of discussion items to provide an effective mix of discussion items to each collaborator, according to an embodiment. For example, one third of featured discussion items for a collaborator may be selected from the top 30% to ensure a high bar of quality. One sixth of featured discussion items may be selected from the middle 30% to include more of the discussion items while filtering out spam. One fourth may be selected from new discussion items to fold in newer submissions. One sixth may be selected from the same geographical area of a collaborator, perhaps for more of a sense of local pride. The final twelfth may be from the lowest 30%. In some cases the last 10% will be ignored. These discussion items with the lowest voting scores may be placed on probation. Discussion items flagged as inappropriate more than a certain number of times may also be placed on probation. Discussion items placed on probation may be excluded from the selection process described above.

According to a further embodiment, discussion items placed on probation may be provided to more reliable collaborators to verify if probation is warranted. In another embodiment, selection module 116 may be configured to feature every discussion item not on probation. This example is for purposes of illustration and is not meant to limit how discussion items are selected.

In another embodiment, discussion items currently in the lead or found through search results may be weighted less than discussion items of a higher rank. In some cases, those in the lead or found through searching may be excluded from selection as a featured item.

Aspects of the present invention, for example, systems 100-300 and/or method 400 or any part(s) or function(s) thereof may be implemented using hardware, software, firmware, tangible computer readable or computer usable storage media having instructions stored thereon, or a combination thereof and may be implemented in one or more computer systems or other processing systems.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined Only in accordance with the following claims and their equivalents.

What is claimed is:

1. A computer-implemented method for distributed discussion collaboration during a live event having a focal point of discussion, comprising:

receiving, by a server coupled to a computer network, one or more discussion items associated with an event by one or more participating collaborators of the event, wherein the one or more discussion items relate to a focal point of discussion;

providing, by the server coupled to the computer network, the one or more discussion items for display to the one or more participating collaborators;

receiving, by the server coupled to the computer network, voting information for the one or more discussion items displayed to the one or more participating collaborators during the event;

receiving, by the server coupled to the computer network, profile information associated with the one or more participating collaborators;

applying, by the server coupled to the computer network, a reliability score to the voting information based on the profile information of the one or more participating collaborators; and determining, by the server coupled to the computer network, an order of the one or more discussion items for the event based on the reliability score.

2. The computer-implemented method of claim 1, wherein the event is one of a talk, a presentation, a performance, a speech, a debate, a panel discussion, an athletic event, a play, a town hall meeting, a showing, or a viewing.

3. The computer-implemented method of claim 1, wherein the focal point of discussion is one of a speaker, a presentation topic, a political candidate, a panel of speakers, an actor, a singer, an athlete, a video, an audio item, or any other person or thing that draws the attention of an audience or participants to the same focus of discussion during the event.

4. The computer-implemented method of claim 1, further comprising weighting the one or more participating collaborators votes on the one or more discussion items based upon additional information associated with the one or more participating collaborators.

5. The computer-implemented method of claim 4, wherein the weighting includes weighting the votes of the one or more participating collaborators based upon a measure of conformity of the one or more participating collaborators voting history to a voting history of a group of collaborators.

6. The computer-implemented method of claim 4, wherein the weighting includes weighting the vote of the one or more participating collaborators based upon a measure of voting experience of the one or more participating collaborators.

7. The computer-implemented method of claim 1, wherein the receiving one or more discussion items includes receiving a discussion item with a negative voting history for voting by the group of collaborators, wherein the one or more participating collaborators of the select group are selected based upon a measure of voting experience and a voting history.

8. The computer-implemented method of claim 1, wherein the receiving one or more discussion items includes selecting a discussion item for the one or more of the participating collaborators based upon a rank of the discussion item and a measure of voting experience of the one or more participating collaborators.

9. The computer-implemented method of claim 1, wherein the receiving one or more discussion items includes selecting a discussion item for the one or more participating collaborators based upon a rank and a submission time of the discussion item.

10. The computer-implemented method of claim 1, wherein the receiving one or more discussion items includes selecting a discussion item for the one or more participating collaborators based upon a remaining time for voting and a rank and voting history of the featured discussion item.

11. The computer-implemented method of claim 1, wherein the providing the one or more discussion items for display includes providing two or more featured discussion items for display based upon a relationship between the two or more featured discussion items.

12. The computer-implemented method of claim 1, wherein the profile information of the one or more participating collaborators includes geographical information, collaborator identity, a voting history, and a discussion topic preferences of the one or more participating collaborators.

13. A system comprising:
a selection module, implemented on one or more computing devices, configured to receive one or more discussion items associated with an event by one or more participating collaborators of the event, wherein the one or more discussion items-relate to a focal point of discussion;
a view controller, implemented on the one or more computing devices, configured to provide the one or more discussion items for display to the one or more participating collaborators;
a voting module, implemented on the one or more computing devices, configured to receive voting information for the one or more discussion items displayed to the one or more participating collaborators;
the voting module further configured to receive profile information associated with the one or more participating collaborators, and further configured to apply a reliability score to the voting information based on the profile information of the one or more participating collaborators; and
an ordering module, implemented on the one or more computing devices, configured to determine an order of the one or more discussion items for the event based on the reliability score.

14. The system of claim 13, wherein the voting module is configured to receive voting information during the event for the one or more discussion items over a network.

15. The system of claim 13, wherein the voting module is configured to weight the one or more participating collaborator's votes on the one or more discussion items based upon additional information associated with the one or more participating collaborators.

16. The system of claim 15, wherein the additional information includes a measure of conformity of the one or more participating collaborators voting history to a voting history of a group of collaborators.

17. The system of claim 15, wherein the additional information includes a measure of voting experience of the one or more participating collaborators.

18. The system of claim 13, wherein the selection module is configured to receive one or more discussion items a negative voting history for voting by a group of collaborators, wherein the one or more participating collaborators of the select group are selected based upon a measure of voting experience and a voting history.

19. The system of claim 13, wherein the selection module is configured to receive one or more discussion items for display to the one or more participating collaborators based upon a rank of the one or more discussion items and a measure of voting experience of the one or more participating collaborators.

20. The system of claim 13, wherein the selection module is configured to receive one or more discussion items for display based upon a rank and a submission time of the one or more discussion items.

* * * * *